United States Patent
Forster

(10) Patent No.: US 7,233,250 B2
(45) Date of Patent: Jun. 19, 2007

(54) RADIO FREQUENCY IDENTIFICATION DEVICE WITH VISUAL INDICATOR

(75) Inventor: Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 259 days.

(21) Appl. No.: 11/025,711

(22) Filed: Dec. 29, 2004

(65) Prior Publication Data

US 2006/0145865 A1    Jul. 6, 2006

(51) Int. Cl.
G08B 13/14    (2006.01)

(52) U.S. Cl. .............................. 340/572.8; 340/691.6; 236/492

(58) Field of Classification Search ............ None
See application file for complete search history.

(56) References Cited

U.S. PATENT DOCUMENTS

| | | | |
|---|---|---|---|
| 4,225,216 A | | 9/1980 | Boyd et al. |
| 4,505,498 A | | 3/1985 | Weinberger |
| 4,723,656 A | | 2/1988 | Kiernan et al. |
| 5,251,048 A | | 10/1993 | Doane et al. |
| 5,490,956 A | | 2/1996 | Kito et al. |
| 5,600,231 A | | 2/1997 | Parker |
| 5,625,334 A | * | 4/1997 | Compton ............... 340/309.7 |
| 5,625,477 A | | 4/1997 | Wu et al. |
| 5,673,028 A | | 9/1997 | Levy |
| 5,889,267 A | * | 3/1999 | Robin et al. ............ 235/380 |
| 5,952,922 A | * | 9/1999 | Shober .................. 340/572.4 |
| 5,995,048 A | * | 11/1999 | Smithgall et al. ..... 343/700 MS |
| 6,025,780 A | * | 2/2000 | Bowers et al. .......... 340/572.3 |
| 6,107,920 A | | 8/2000 | Eberhardt et al. |
| 6,206,292 B1 | | 3/2001 | Robertz et al. |
| 6,262,692 B1 | | 7/2001 | Babb |

(Continued)

FOREIGN PATENT DOCUMENTS

WO    WO 90/13096    11/1990

(Continued)

OTHER PUBLICATIONS

Kavoossi, Babak; Printed Micro Systems on Paper. Active imaging and Visual Information on Paper and Paper-Based Products. Helsinki University of Technology Laboratory of Media Technology, Dec. 2001.

(Continued)

Primary Examiner—Benjamin C. Lee
(74) Attorney, Agent, or Firm—Renner, Otto, Boisselle & Sklar, LLP

(57) ABSTRACT

An RFID device includes a chip, an antenna operatively coupled to the chip, and a visual indicator operatively coupled to the chip. The visual indicator provides a visual indication of an operative state of the device. The visual indication may be human readable and/or machine readable, and may provide visual indication that is dependent on a change in an operative state of the device. The operative state that triggers the visual indication may include a state in which the chip has temporarily or permanently been rendered inoperative or disabled, that is, in which the chip no longer responds to, or otherwise interacts with, ordinary incoming RF signals such as from a device reader. The visual indicator may be included in a display that functions by any of a variety of suitable mechanisms, such as by use of electrochromic materials, thermochromic materials, liquid crystals, or chemically-reactive materials.

17 Claims, 6 Drawing Sheets

U.S. PATENT DOCUMENTS

| | | |
|---|---|---|
| 6,685,091 B2 * | 2/2004 | Rapp et al. .................. 235/385 |
| 6,752,321 B1 * | 6/2004 | Leaming ...................... 235/492 |
| 6,908,036 B2 * | 6/2005 | Koshimizu et al. .......... 235/492 |
| 7,086,588 B2 * | 8/2006 | Hoshina ...................... 235/380 |
| 2002/0105065 A1 | 8/2002 | Parrault |
| 2002/0171081 A1 | 11/2002 | Vincent et al. |
| 2003/0169574 A1 | 9/2003 | Maruyama et al. |
| 2004/0074973 A1 | 4/2004 | Schneck et al. |
| 2004/0118930 A1 * | 6/2004 | Berardi et al. ............... 235/492 |
| 2004/0164166 A1 * | 8/2004 | Mahany et al. ......... 235/472.02 |
| 2005/0040242 A1 * | 2/2005 | Beenau et al. ............... 235/492 |
| 2005/0134461 A1 * | 6/2005 | Gelbman et al. ......... 340/572.8 |

FOREIGN PATENT DOCUMENTS

| | | |
|---|---|---|
| WO | WO 01/73864 | 10/2001 |
| WO | WO 2004/053721 | 6/2004 |
| WO | WO 2004/090805 | 10/2004 |

OTHER PUBLICATIONS

AUTO-ID Center: "Draft Protocol Specification for a 900 MHz Class 0 Radio Frequency Identification Tag" Feb. 23, 2003, Massachusetts Institute of Technology, XP002375379, cited in the application p. 42.

* cited by examiner

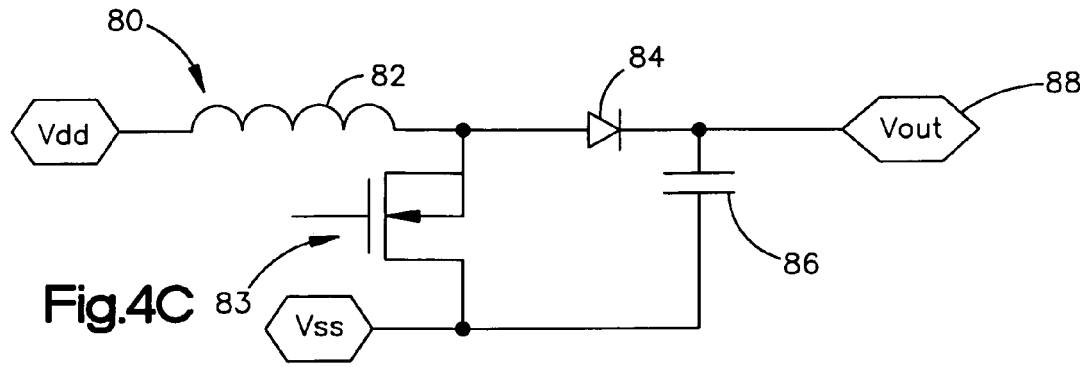
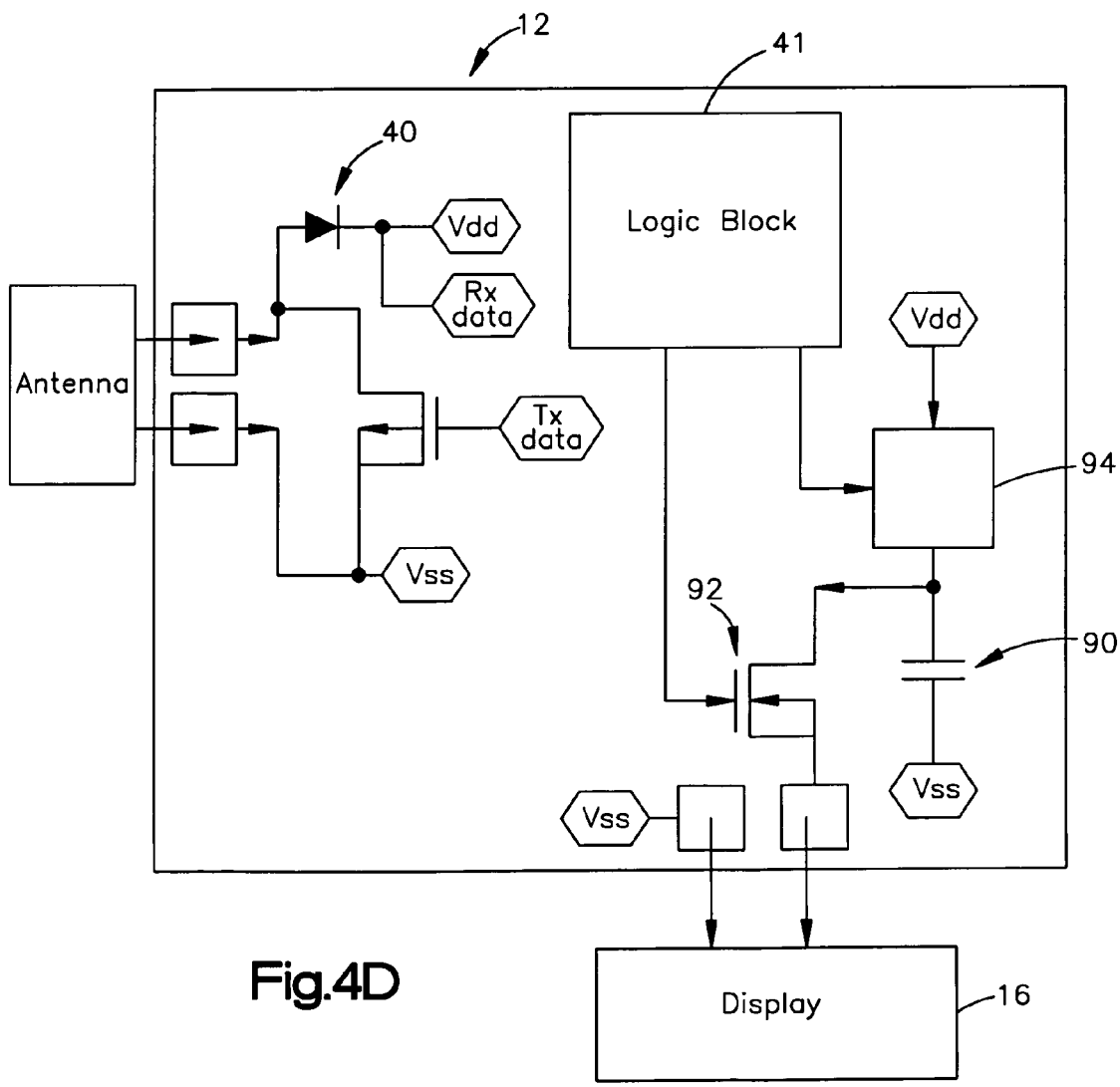

RADIO FREQUENCY IDENTIFICATION DEVICE WITH VISUAL INDICATOR

BACKGROUND OF THE INVENTION

1. Technical Field of the Invention

The invention relates to radio frequency identification (RFID) devices.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,692, all of which are hereby incorporated by reference in their entireties.

As noted above, RFID devices are generally categorized as labels or tags. RFID labels are RFID devices that are adhesively or otherwise have a surface that is attached directly to objects. RFID tags, in contrast, are secured to objects by other means, for example by use of a plastic fastener, string or other fastening means. Nevertheless, RFID devices are referred to herein somewhat interchangeably as "tags" or "labels."

In activating, reading, and/or detecting RFID devices, radio frequency (RF) fields are generally sent over a relatively long range, that is, over intervening free space. Thus detection of devices is accomplished over a significantly-sized region, and spatial discrimination in reading and detection of devices may be difficult.

One concern that has been raised regarding RFID devices is that their ability to be read over relatively long distances may implicate privacy concerns for people having objects with RFID devices attached thereto or otherwise coupled thereto. It will be appreciated that concerns about possible tracking or other privacy-related issues may inhibit some users from employing RFID devices. Accordingly, it will be appreciated that it would be desirable for RFID devices to avoid the above problems.

SUMMARY OF THE INVENTION

According to an aspect of the invention, an RFID device includes a display that selectively shows one or more visual indicators. Display of the one or more visual indicators may be actuated based on an operating state of the RFID device.

According to another aspect of the invention an RFID device includes an electrochromic display that is operatively coupled to a chip of the device.

According to still another aspect of the invention, an RFID device includes a display for displaying a visual indication of the disabling of operation of the RFID device.

According to a further aspect of the invention, an RFID device includes a display for displaying a visual indicator that is readable only using light outside of the wavelength range normally viewable by humans (i.e., ultraviolet light and/or infrared light).

According to a still further aspect of the invention, an RFID device includes: a chip; an antenna operatively coupled to the chip; and a display operatively coupled to the chip. The antenna is configured for receiving energy to power the chip. The antenna is configured to receive information signals to be passed on to the chip. The display includes a visual indicator that provides a visual indication of an operative state of the device.

According to another aspect of the invention, an RFID device includes: a chip; an antenna operatively coupled to the chip; and a display operatively coupled to the chip. The antenna is configured to receive information signals to be passed on to the chip. The display includes a visual indicator that provides a visual indication that normal operation of the device is disabled.

According to yet another aspect of the invention, a method of using a radio frequency identification (RFID) device includes the steps of: disabling normal operation of the device, thereby placing the device in a disabled state; and displaying a visual indication on a display of the device, wherein the visual indication indicates the disabled state.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 4C is a schematic illustration of a voltage converter that may be part of an RFID device in accordance with the present invention;

FIG. 4D is another possible configuration of the RFID device of FIG. 1;

DETAILED DESCRIPTION

An RFID device includes a chip, an antenna operatively coupled to the chip, and a visual indicator operatively coupled to the chip. The visual indicator provides a visual indication of an operative state of the device. The visual indication may be human readable and/or machine readable, and may provide visual indication that is dependent on a change in an operative state of the device. The operative state that triggers the visual indication may include a state in which the chip has temporarily or permanently been rendered inoperative or disabled, that is, in which the chip no longer responds to, or otherwise interacts with, ordinary incoming RF signals such as from a device reader. The visual indicator may be included in a display that functions by any of a variety of suitable mechanisms, such as by use of electrochromic materials, thermochromic materials, liquid crystals, or chemically-reactive materials. The visual indication may include any of a wide variety of human-readable or machine-readable indications, for example, including words, symbols, and/or colors, and/or by hiding and/or revealing underlying human-readable or machine-readable indicia. The display that includes the visual indicator may have a single changeable element, or may have multiple elements. Displays with multiple elements may be configured to show different combinations of elements to provide visual indications of different operative states of the RFID device. The device with the visual indicator may be used to communicate a wide variety of different information on operative states, for a wide variety of different purposes. One possible use for the RFID device is to provide a visual indication when the device is rendered permanently inoperative following the receipt by the device of a signal indicating that the device is to disable itself from further operation. Such a visual indication of device inoperability may aid in allaying privacy-based concerns regarding RFID devices.

Figure 1:
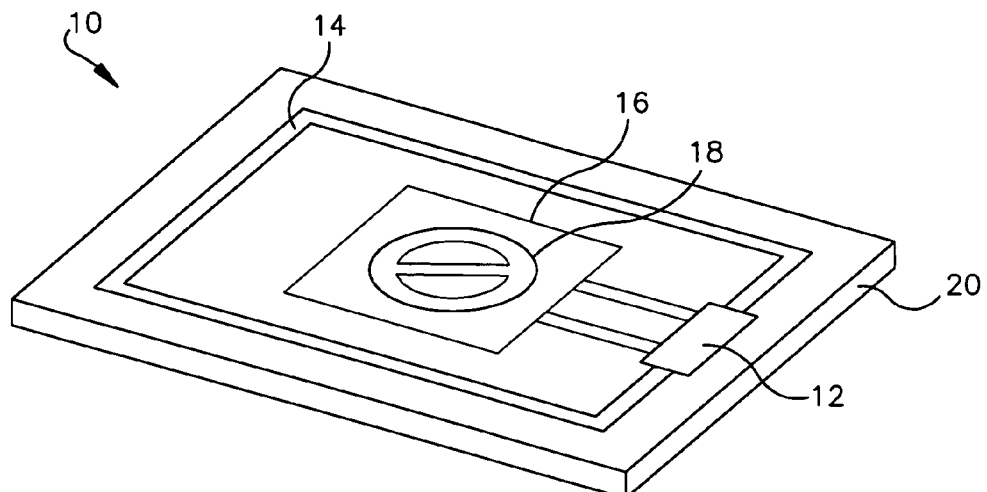
FIG. 1 is an oblique view of a RFID device in accordance with the present invention.

Referring to FIG. 1, an RFID device 10 includes a chip 12, an antenna 14 coupled to the chip 12, and a display 16 coupled to the chip 12. The display 16 includes a visual indicator 18 for providing a human-readable and/or machine-readable visual indication of an operative state of the RFID device 10. The visual indicator 18 may indicate an operative state of the chip 12. All of the components 12–18 of the RFID device 10 may be mounted on a suitable substrate 20.

A "transponder chip" or "chip" is defined as a device for providing suitable interaction, through an antenna, for communication with an external device, such as a reader. A chip may include any of a variety of suitable electrical components, such as resistors, capacitors, inductors, batteries, memory devices, and processors. It will be appreciated that a large variety of transponder chips for RFID devices are widely known. The term "transponder chip" is intended to encompass the broad range of such devices, which may vary widely in complexity and functionality.

The antenna 14 may be any of a variety of suitable types of antennas for RFID devices. Examples of suitable types of antennas include dipole antennas, loop antennas, slot antennas, coil antennas, and hybrid antennas combining structures and characteristics of various antenna types.

The chip 12 and the antenna 14 may interact with a communication device, such as an RFID device reader or detector, in a variety of suitable ways. The RFID device 10 may be a fully passive device, in which the antenna 14 receives signals which, when rectified, provide power for the chip 12, and, if required provide commands from the reader to the chip in the form of amplitude modulation of the signal. To send a signal from the RFID device to the reader, the device modulates its input impedance with a data-carrying signal. For low frequency tags, those operating at typically 125 kHz and 13.56 MHz, the effect of this modulation is best described as an increase in the load presented to the reader transmitter, for high frequency signals, such as those in the band 902–928 MHz, it is usually described as a form of reflection or backscatter modulation.

Alternatively, the RFID device 10 may be a semi-passive RFID device. As with a fully passive RFID device, a semi-passive RFID device does not generate its own radio signals. However, unlike the fully passive device, in the semi-passive device the logic functions of the chip 12, and the communication functions of the chip 12, are powered by a battery or other energy storage device. Communication with a semi-passive device is similar to communication with a fully passive device, in that in both devices communication from the device occurs by reflection of an incident signal back to a device reader or detector.

Another alternative for the RFID device 10 is an active RFID device. An active device contains its own power source, such as a battery, for providing power to the chip 12, and for transmitting signals from the chip 12, via the antenna 14.

The communication by RF signals of the RFID device 10 with external devices is referred to herein as normal operation of the RFID device 10. This normal operation may be accomplished by reflecting of signals (for passive and semi-passive devices) or by the transmitting of signals (for active devices). An RFID device that is rendered by internal mechanisms temporarily or permanently unable to send signals (by reflecting or transmission) is referred to herein as being disabled.

The display 16 may be any of a variety of suitable types of displays. Examples of such displays include electrochromic displays, thermochromic displays, liquid crystal displays (LCDs), and displays containing chemically-reactive materials. At least some of these types of displays are discussed in greater detail below. The display 16 may have its own power source, such as from a battery or a capacitor. Alternatively, or in addition, the display 16 may utilize the same active or passive power source used to power the chip 12.

The visual indicator 18 may include any of a wide variety of types of visual elements that are readable or otherwise detectable by human vision and/or machine vision. The visual indicator may include a plurality of separately or simultaneously actuatable elements, or may alternatively be a single element. The visual indicator 18 provided may include display of one or more symbols, such as the display of letters or words. Alternatively, or in addition, the visual indicator 18 may include graphic elements, such as stylized pictures. The visual indicator 18 may include a change of color, either alone or in addition to the display of other types of visual elements. The visual indicator 18 may also include a change in emissivity of a material, for example, revealing or obscuring visible indicia, such as printed matter, that are underneath the display 16. Such indicia, for example, including bar code elements, may be printed on the substrate 20. It will be appreciated that color change in the visual indicator 18 may be used to obscure or reveal underlying material, for example, visual elements printed in a similar color. The visual indicator 18 may involve visual material which may be viewed under ordinary human-visible light. Alternatively or in addition, the visual indicator 18 may involve material that is visually-readable only in other sorts of light, such as infrared light or ultraviolet light. A further possibility for the visual indicator 18 is an indicator such as a bar code that is visually detectable by humans, but is only meaningfully deciphered (read) by or with the assistance of machines or devices.

The RFID device 10 may include a wide variety of other layers and/or components. For example, the RFID device 10 may be a label that includes an adhesive layer with a peelable cover layer. As another example, the RFID device 10 may include protective layers for protecting the operative components of the device, and/or may include a printable layer or region, for example, for including a bar code or other information.

Figure 2:
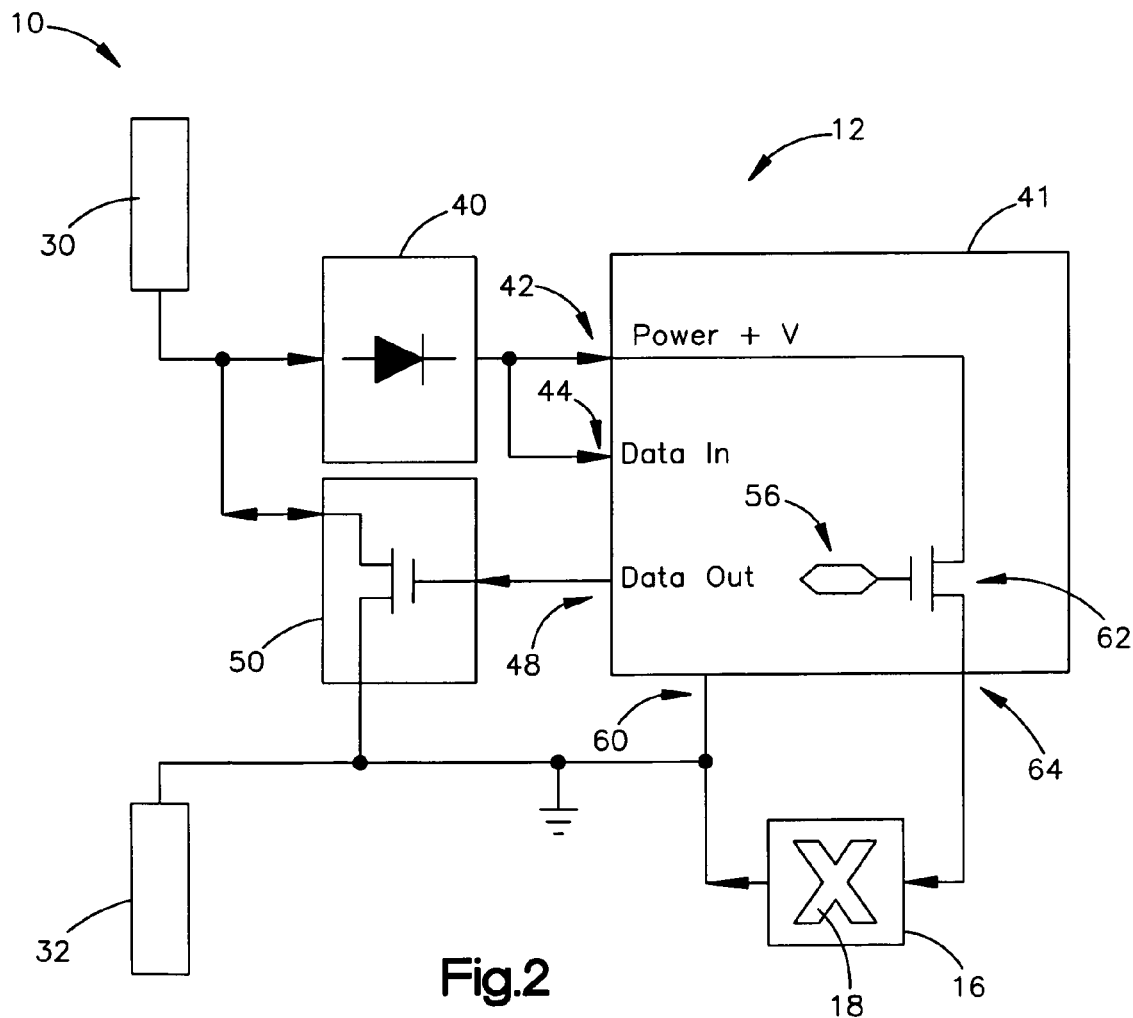
FIG. 2 is a block diagram of one possible configuration of the RFID device of FIG. 1.
Figure 3:
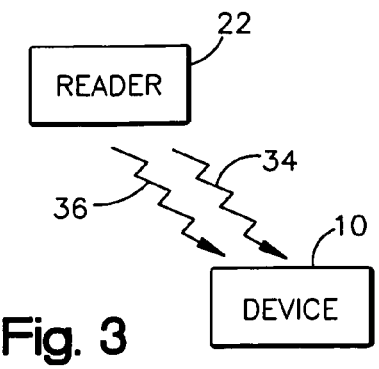
FIG. 3 is a schematic diagram showing interaction of an RFID reader/detector, and the RFID device of FIG. 1.

FIG. 2 shows a block diagram of one possible configuration of a fully passive version of the RFID device 10. FIG. 3 schematically illustrates interaction between an RFID device reader or detector 22, and the RFID device 10 of FIG. 2. Antenna elements 30 and 32 of the device 10 receive signals 34 and 36 sent by the device reader 22. The signals sent by the device reader 22 include an unmodulated continuous-wave RF power signal 34, and an amplitude modulated RF instruction signal 36. The unmodulated power signal 34 provides power to the RFID device 10, while the instruction signal 36 provides commands to the chip 12 of the device 10. The signals 34 and 36 may be sequentially emitted by the reader 22, in order to power the device 10, and to interrogate or command the RFID device 10. Alternatively, in the situation where a reduced amplitude modulation depth data signal is used, the device 10 may receive power and commands simultaneously.

Both of the signal types 34 and 36 are received by the antenna elements 30 and 32 of the device 10. The element 32 acts as a power ground for the device 10. Signals from the antenna element 30 pass through a rectifier 40, and into a chip logic block 41. Specifically, the incoming signal from the rectifier 40 enters the chip logic block 41 through a power port 42 and a data in port 44. The data out port 48 of the logic block 41 may be coupled to a modulation transistor 50 for changing impedance of the device 10. The modulation transistor 50 is coupled to both of the antenna elements 30 and 32. The incoming power signal 34 provides power for operating the chip logic block 41. The logic block 41 acts upon commands that are received by the incoming instruction signal 36. These instructions may involve having the logic block 41 modify a register in a memory location 56. Instructions may also involve sending a signal through the data out port 48 to modulate impedance through the modulation transistor 50. This change in impedance may be detected by the reader/detector 22 in its effect on the unmodulated power signal 34. The antenna element 32, which functions as a power ground, is also coupled to a ground port 60 of the logic block 41.

The logic block 41 may be configured such that when a predetermined value is placed in a memory location 56, a switch 62 is tripped to provide high voltage through a power output port 64 and to the display 16. (A predetermined input signal may be used to put the value in the memory location 56.) The "high voltage" supplied through the power output port may be a rectified supply voltage, such as at around 1–2 volts. The display 16 is also coupled to the ground port 60. Providing high voltage through the power output port 64 causes a change in a visual indicator 18 of the display. Thus, the device 10 is configured such that writing of a predetermined value to the memory location 56 also results in display of the visual indicator 18.

The signal sent to the RFID device 10 to trigger display of the visual indicator 18 may be a "kill" or "self-destruct" signal that disables operation of the logic 41 of the chip 12. Examples of such signals may be found in Technical Report: 13.56 MHz ISM Band Class 1 Radio Frequency Identification Tag Interface Specification: Candidate Recommendation, Version 1.0.0 (describing a Destroy command); Draft Protocol Specification For a 900 MHZ Class 0 Radio Frequency Identification Tag (describing a Kill function); and Technical Report: 860 MHz–930 MHz Class I Radio Frequency Identification Tag Radio Frequency & Logical Communication Interface Specification Candidate Recommendation, Version 1.0.1. All of these reports are published by the Auto-ID Center of the Massachusetts Institute of Technology, all are available on line at www.epcglobalinc.org, and all are incorporate herein by reference.

The above-described de-activation of the chip 12 may be a reversible or irreversible operation. Further, the device 10 may be configured so that only some of kill or disable signals trigger activation of the display 16. For example, the device 10 may be configured so that a password, key, or other specific type of kill command triggers activation of the display 16.

Figure 4A:
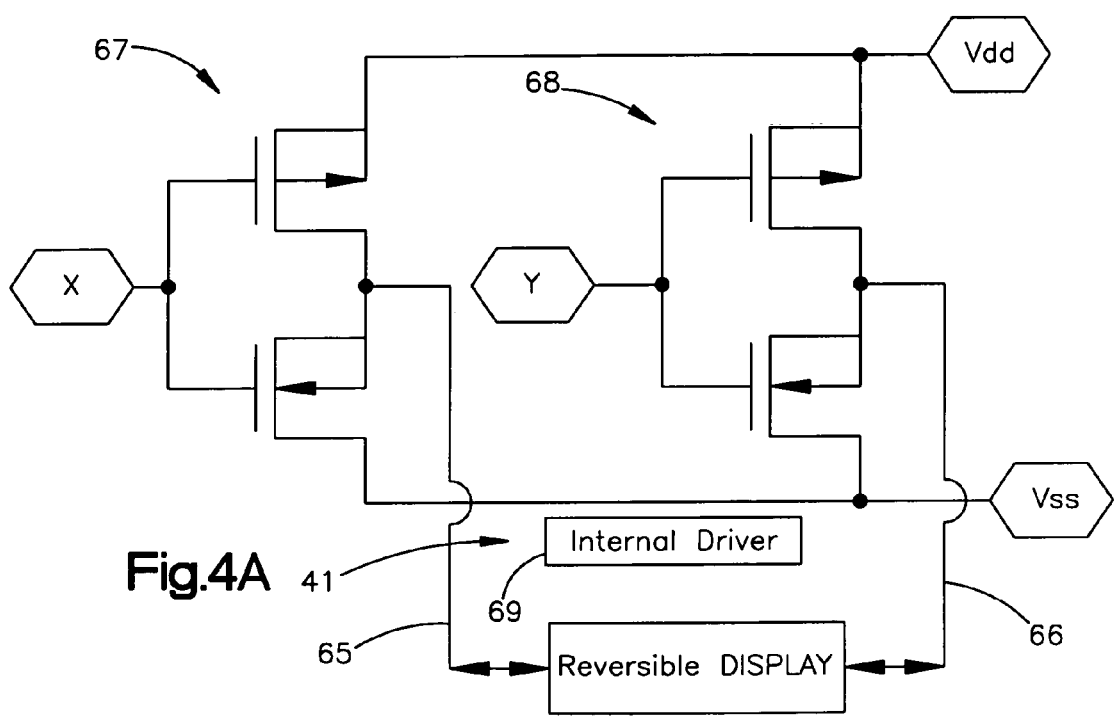
FIG. 4A is a schematic illustration of an alternate configuration of the RFID device of FIG. 1.

FIG. 4A illustrates one possible alternate configuration for providing switchable power to the display 16, through a pair of input/output ports 65 and 66 that are part of the logic block 41. A pair of field effect transistors 67 and 68 are coupled to a system supply voltage Vdd and a system ground voltage Vss. An internal driver 69 of the logic block 41 provides signals X and Y to the field effect transistors 67 and 68 to direct the desired voltage to the ports 65 and 66. The signals X and Y may configure the field effect transistors 67 and 68 to provide the same voltage, either Vdd or Vss, to both of the ports 65 and 66, providing no voltage difference across the display 16. The signals X and Y may also be used to provide a voltage difference across the ports 65 and 66 in either direction (and thus across the display 16 as well), with the supply voltage Vdd supplied to either port, and with ground voltage supplied to the other port. Thus the display 16 may be driven in either direction.

Figure 4B:
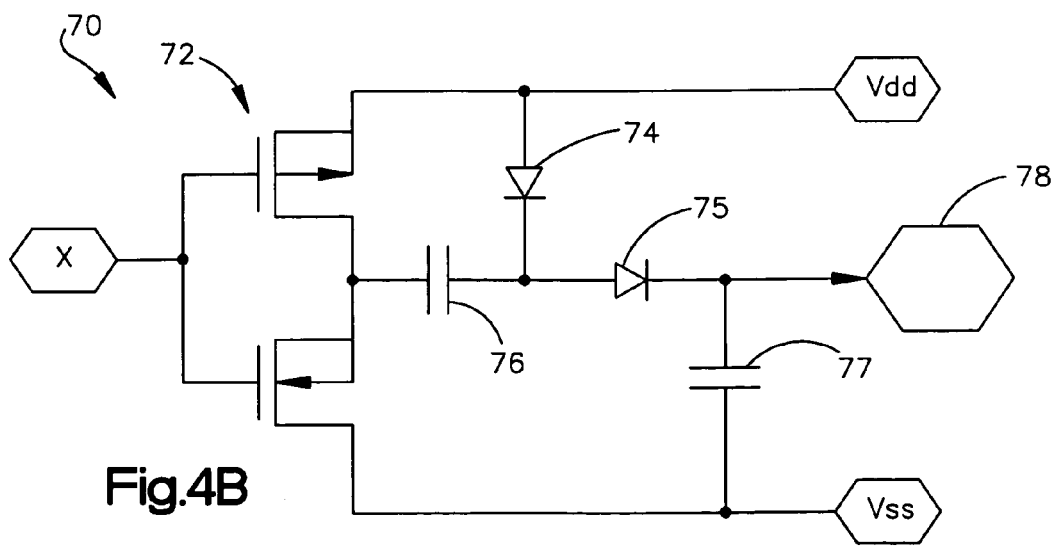
FIG. 4B is a schematic illustration of a voltage multiplier that may be part of an RFID device in accordance with the present invention.

Various forms of voltage converters or voltage multipliers may also be used as part of the device 10, as illustrated in FIGS. 4B and 4C, to increase the supply voltage of the device 10. The voltage multiplier 70 shown in FIG. 4B shows a field effect transistor 72 coupled to a supply voltage Vdd and a ground voltage Vss. A pair of diodes 74 and 75 and a pair of capacitors 76 and 77 are used to increase the output voltage 78 of the voltage multiplier. Depending upon the input signal X to the field effect transistor 72, the output voltage 78 may be up to two times the supply voltage Vdd. The output voltage 78 may be used to drive the display 16 (FIG. 4A), or may be fed to further voltage multipliers.

FIG. 4C illustrates a voltage converter 80 that includes an inductor 82 coupled to a supply voltage Vdd. A transistor 83 is coupled to output from the inductor 82 and to a ground voltage Vss. A diode 84 and an output capacitor 86 also make up part of the voltage converter 80. The transistor 83 sequentially shorts the inductor 82 across the supply voltage Vdd and the ground voltage Vss. As the current through the inductor 82 changes, it generates a voltage proportional to the rate of change of the current. This change in voltage charges the output capacitor 86 to a higher voltage, resulting in a higher output voltage 88 for the voltage converter 80.

The voltage converters 70 and 80 may be incorporated into the device 10 in any of a variety of suitable ways. The converters 70 and 80 may be parts of the chip 12, or may alternatively be separate from the chip 12. Multiple converters may be utilized, for example being placed in series, to achieve a desired voltage for driving the chip 12 and/or the display 16.

FIG. 4D shows a variation of the passive device of FIG. 2, in which an energy storage device 90, such as a battery or capacitor, is added. The energy storage device 90 is configured so as to be coupled to the display 16 when a display control switch 92 is activated. Energy in the energy storage device 90 may be used in driving operation of the display 16. The device 10 may be configured so that the energy storage device 90 is charged or re-charged as excess power (beyond what is needed to operate the chip 12) is received by the antenna elements 30 and 32. A voltage converter 94, such as the voltage multiplier 79 (FIG. 4B) or the voltage converter 80 (FIG. 4C), may be included to provide increased voltage to the display 16, and to the energy storage device 90.

The passive devices 10 described are but a few of the wide variety of possible configurations for the RFID device 10. The devices illustrated in FIGS. 2 and 4 show a configuration suitable for use with UHF RF energy. It will be appreciated that other suitable configurations may be utilized at that frequency or at other suitable frequencies.

Although the RFID devices 10 in FIGS. 2 and 4 are described above as fully passive devices, it will be appreciated that the device in FIG. 4 may correspond to a semi-passive device, where the energy storage device 70 provides power to the chip 12, as well as providing power to the display 16. It will be appreciated that the attachments of the chip 12 and the energy storage device 70, both tuned to the display 16, may also be made part of an active RFID device.

Figure 5:
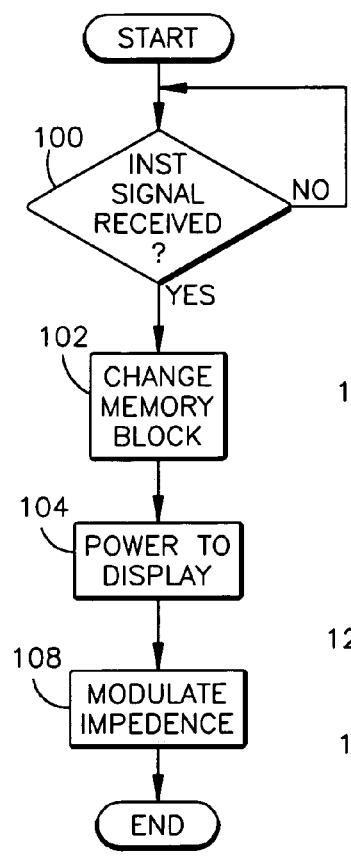
FIG. 5 is a high-level flowchart illustrating some steps in the operation of the display of the RFID device of FIG. 1.

FIG. 5 shows a high-level flowchart of one possible sequence of events in operation of the passive RFID device 10 shown in FIGS. 2 and 4. In step 100 the RFID device 10 maintains itself in a loop, while waiting for an instruction signal to be received to de-activate operation of the chip 12. It will be appreciated that other operations of the RFID device 10 may be accomplished while in this loop. Once an instruction signal is received to de-activate the chip 12, a change is made in the memory block or location 56, as indicated in step 102. In step 104, power is provided to the display 16 through the power out port 64. The power may be the same high voltage as used for operation of the chip 12. This power may be provided by the power signal 34 received through the antenna elements 30 and 32. Alternatively, for a semi-passive chip, the power for operation of the chip 12 may be provided by an energy storage device, such as a battery or capacitor, that is built into the chip 12, or is elsewhere in the RFID device 10. As another alternative, there may be a specific energy storage device 70 for powering the display 16. The powering of the display 16 activates or actuates the visual indicator 18, providing a visual indication of the change of state of the operation of the RFID device 10. Finally, in step 88, impedance of the device 10 may be modulated by sending a signal through the data out port 48 to the modulation transistor 50.

The steps in the flowchart of FIG. 5 are but one way that the RFID device 10 of FIGS. 2 and 4 may be operated. It will be appreciated that the steps shown in FIG. 5 may occur in a different order, or that some of the steps may be augmented or omitted, if suitable. As an example of an additional step that may be part of such an operation, the chip 12 may be configured to send a signal (either by reflection or transmission) confirming that the predetermined signal (such a "kill" signal instructing the chip 12 to disable the device 10) has been received and acted upon by the device 10.

The providing of a power input to the display 16 may be accomplished in a wide variety of suitable ways. One way is to configure the chip 12 so that when a triggering signal is received, high voltage is provided to and maintained to the display 16. This allows possible refreshing of the high voltage provided to the display 16, when the device 10 receives more power from the power signal 34 of the reader/detector 22. Such a configuration may be desirable where the display 16 is of a type that may benefit from periodic refreshing.

Another way of configuring the device 10 is to provide the high voltage to the display 16 for only a limited period of time. This configuration may be suitable for use when actuation of the display 16 involves an irreversible process, for example, the mixing of chemicals. Removal of the high voltage from the display 16 may be desirable to prevent damage to other parts of the device 10, or to prevent undesirable effects on the display 16.

The visual indicator 18 may undergo a permanent (irreversible) change when power is applied to the display 16, which makes a permanent visually-readable display. As one alternative, the change in the visual indicator 18 may be permanent, but may be only intermittently displayable, such as being displayable only when power is applied to the RFID device 10 by having it in proximity to a reader 22 that is emitting an unmodulated power signal 34. As a further alternative, the visual indicator 18 may undergo a reversible change when power is applied to the display 16. Some other process, such as sending a different power signal to the display 16, may cause reversal of the indication provided by the visual indicator 18.

The energy storage device 70 may be part of the display 16, may be part of the chip 12, or may be a separate part of the RFID device 10. The energy storage device 70 may be a printed super capacitor or a printed battery. The energy storage device 70 may be a traditional battery, for example flexible thin-film batteries sold by Cymbet Corporation of Elk Ridge, Minn., USA, which are described further in International Publication WO 01/73864, which is hereby incorporated by reference in its entirety.

Figure 6:
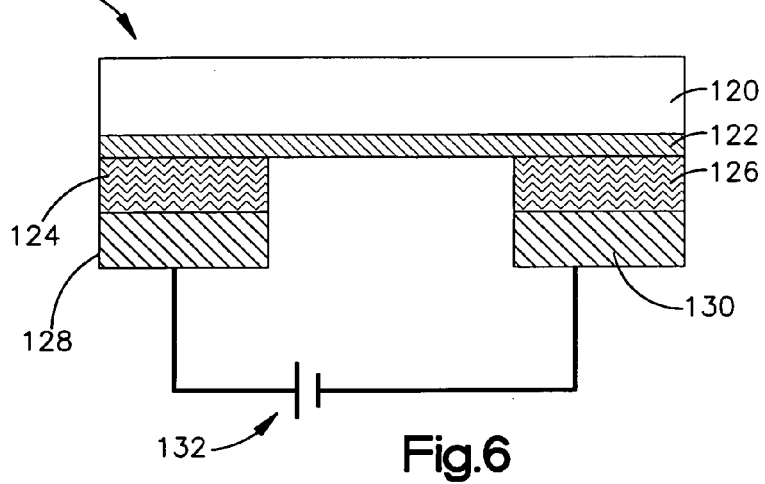
FIG. 6 schematically illustrates an electrochromic display for possible use with the RFID device of FIG. 1.

What follows now are descriptions of some possible mechanisms for use in the display 16. FIG. 6 illustrates an electrochromic display 116 that is one version of the display 16. The electrochromic display 116 includes a film 120 upon which there is an electrolyte 122. On the electrolyte 122 there are electrochromic material portions 124 and 126. The electrochromic material portions 124 and 126 may be configured to have the desired shape for the visual indicator 18 (FIG. 1). Conductive ink portions 128 and 130 are atop respective of the electrochromic material portions 124 and 126. A power supply 132 is coupled to the conductive ink portions 128 and 130, to provide a potential across the conductive ink portions 128 and 130. When electric current flows from the power supply 132, the electrochromic materials 124 and 126 become black and stay black. The electrochromic display 116 requires an electrical current on the order of a few small amps, with a voltage on the order of 0.5V. The electrochromic display 116 allows complex shapes, such as multiple letters, to be displayed in a single step. The display in the electrochromic display 116 may be reversed by reversing the current flow between the electrodes of the display 116.

The electrochromic display 116 may have other suitable elements, such as suitable electrodes, and suitable layers for providing protection to the operative portions of the display 116. Suitable electrochromic materials include electrochromic metal oxides such as $WO_3$ and antimony-doped tin oxide. It will be appreciated that a wide variety of other well-known electrochromic materials, such as suitable metals, viologens, or intrinsically conductive polymers, may be employed. The conductive ink 128 and 130 may be a silver ink. Some or all of the layers of the electrochromic display 116 may be printable layers. Further details regarding electrochromic displays may be found in International Publication No. WO 01/37244, in U.S. Patent Publication No. 2002/0171081, and in U.S. Pat. Nos. 4,723,656, and 4,225,216. The entire disclosures of the above patents and publications are incorporated herein by reference.

Figure 7:
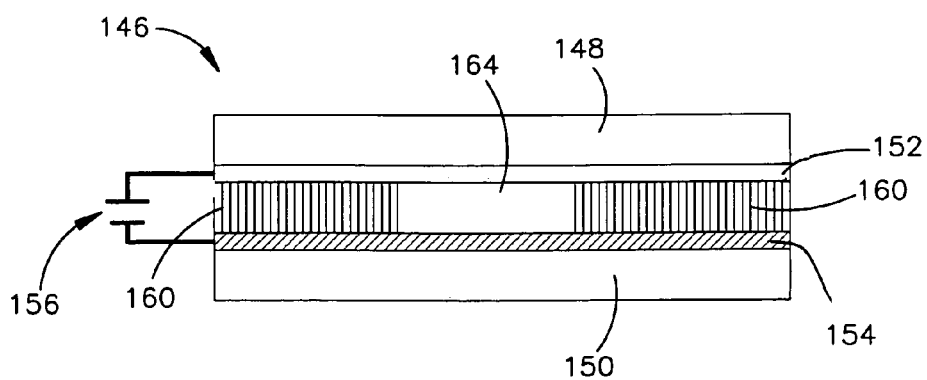
FIG. 7 schematically illustrates a liquid crystal display for possible use with the RFID device of FIG. 1.

FIG. 7 shows an alternative configuration for the display 16, a liquid crystal display 146. The liquid crystal display 146 includes a pair of films 148 and 150, for example being plastic films, which enclose the working parts of the display 146. The films 148 and 150 may enclose a pair of electrodes 152 and 154, which are coupled to a power supply 156. Between the electrodes 152 and 154 are spacers 160, such as small plastic spheres, and a liquid crystal material 164. The liquid crystal material 164 may be a suitable liquid crystal material, such as a suitable cholesteric liquid crystal material, that maintains a desired state once an electric field is applied. One of the electrodes 152 may be a transparent electrode, for example being an indium tin oxide electrode. The other electrode 154 may be made of silver ink with carbon particles added. The electrode 154 may include coloration so that it is color-matched to a scattered mode of the liquid crystal material 164. Alternatively, both of the electrodes 152 and 154 may be substantially transparent.

The liquid crystal material 164 may have two states, a first state where the molecules are randomly oriented, and in which light is scattered and the material is opaque; and a second state in which the liquid crystal molecules are oriented in the direction of an applied electric field across the electrodes 152 and 154, making the liquid crystal material 164 substantially transparent. The display 146 may be changed from one state to another by applying a sufficient potential from the power generator 156, across the electrodes 152 and 154, to cause the liquid crystal material 164 to re-orient itself. Thus, the liquid crystal material 164 may selectively be substantially opaque or substantially transparent, either obscuring or revealing the underlying material of the electrode 154. Thus, for instance, color in the electrode 154 may either be obscured or displayed. It will be appreciated that indicia, such as words or symbols, may be printed in the electrode 154, or elsewhere on the film 150 (if the electrode 154 is substantially transparent), with the indicia being selectively revealed or obscured by changing the state of the liquid crystal material 164.

One example of a suitable reflective and bi-stable liquid crystal material is a Surface Stabilized Cholesteric liquid crystal or SSChLC, having the following formulation: 82.1% liquid crystal ZLI-5400-100 (Merck), 5.7% chiral compounds ZLI-4572 (Merck), and 12.2% CB-15. Spacers of 5 microns may be used to define the cellgap. Both substrates may be coated with a polyimide, e.g., the Nissan Chemical's polyimide SE-610. An absorber may be applied on the bottom surface of the device. Such a device displays either green or black.

The above technology may be modified to display white and black, with the liquid crystal mixture having the following formulation: 80.8% liquid crystal ZLI-5400-100 (Merck), 5.5% chiral compounds ZLI-4572 (Merck), and 13.7% ZLI-3786 (Merck). Further details regarding liquid crystal materials may be found in U.S. Pat. Nos. 5,251,048 and 5,625,477, both of which are herein incorporated by reference in their entireties.

Figure 8:
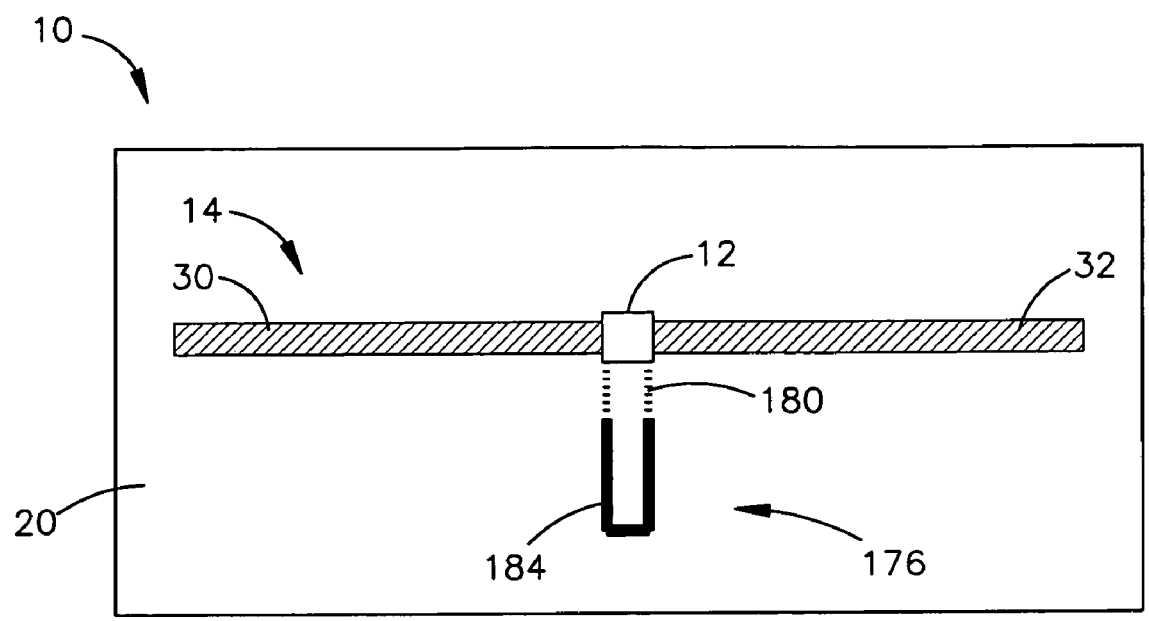
FIG. 8 is a plan view of an RFID device, in accordance with the present invention, that utilizes a thermochromic display.

FIG. 8 illustrates a thermochromic display 176 that may be used as yet another alternative for the display 16. The thermochromic display 176 includes a resistive track 180 of conductive material, and a thermochromic material 184 on at least part of the resistive track 180. The resistive track 180 is coupled to contacts of the chip 12. Providing power to the resistive track 180 causes current flow in the track 180 that heats the conductive material, and the nearby thermochromic material 184. This heating may cause a color change in the thermochromic material 184, thus providing a visual indicator.

An example of a suitable thermochromic material is a material sold under the designation R45 Matsui, Inc. by Matsui Chemical Company of Kyoto, Japan. It will be appreciated that many other suitable thermochromic materials are available, and that thermochromic materials may be selected with any of a wide variety of characteristics. It will further be appreciated that the visual change in the thermochromic material 184 is temporary, and fades soon after current is no longer applied to the resistive track 180. However, it will be appreciated that the thermochromic display 176 may be configured so that the visual indicia is refreshable. That is, whenever power is applied to the RFID device 10, currents may flow anew through the resistive track 180, thereby heating and again changing color of the thermochromic material 184. Further details concerning thermochromic displays may be found in U.S. Pat. No. 5,600,231, which is herein incorporated by reference in its entirety.

Figure 9:
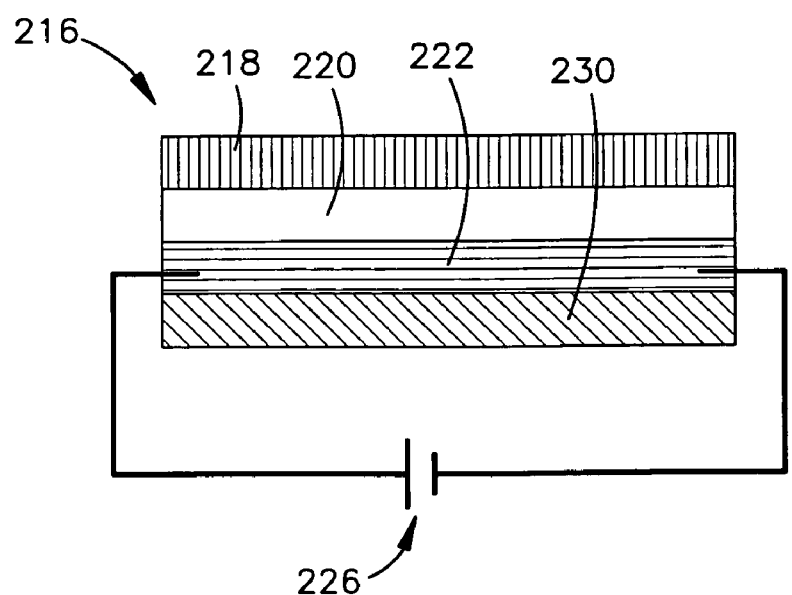
FIG. 9 is a schematic diagram illustrating configuration of a chemically-reactive-material display, for possible use with the RFID device of FIG. 1.

FIG. 9 illustrates still another possible configuration for the display 16, in this case a display 216 that involves mixing of two chemically-reactive materials. The display 216 includes an indicator material 218, a diffusion control layer 220, a barrier layer 222 that is coupled to a power supply 226, and a reactive layer 230. A color change in the display 216 occurs when the reactant material 230 and the indicator material 218 are mixed together. The barrier layer 222 initially prevents passage of the reactant layer 230. The barrier layer 222 may be a suitable material, such as a wax, that loses its structural material when heated. When power is applied, using the power supply 226, across the barrier 222, the barrier 222 breaks down, allowing passage of the reactant material 230. The reactant 230 diffuses through the diffusion control layer 220, and eventually reaches the indicator material 218. Once the reactant material 230 reaches the indicator material 218, a color change occurs in the indicator 218, due to a chemical reaction. The diffusion control layer 220 controls the timing and rate of the reaction between the reactant 230 and the indicator 218. Many well-known chemically-reactive pairs of materials may be utilized. The chemically-reactive material display 216 may be on the order of a few microns thick.

As another possibility, the display 16 may have multiple segments connected in parallel, all of initially the same color. Certain of the segments may have a small amount of a suitable chemical inhibitor added to them as they are printed. When a voltage is applied across the display, only those segments without the inhibitor change color, displaying a desired visual indicator. The segments may be such that chemical analysis (and destruction of the device) would be required to determine a priori which of the segments contain the inhibitor. Such a display may be provide additional security against determination of the visual indicator by tampering with the device 10.

It will be appreciated that other types of displays are possible for use as part of the display 16. For example, ferrofluids may be utilized. Ferrofluids are fluids that change in appearance or become visible with the application of a magnetic field. Examples of such fluids are described in U.S. Patent Publication No. 2004/0074973, the disclosure of which is herein incorporated by reference. It may also be possible to utilize electrophoretic displays.

It will be appreciated that other elements, for instance, color filters, may be added to the displays described above, in order to achieve desired visual effects. Other types of elements may also be included to provide various visual effects. For example, additional visual effects, such as color change and intermittently flashing elements, may be achieved.

Figure 10:
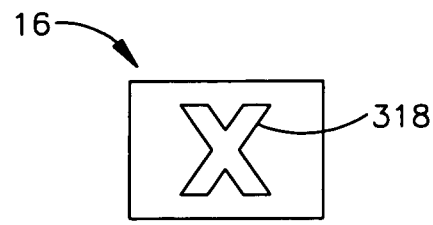
FIGS. 10 and 11 illustrate two possible visual indicators that may be displayed in use of the RFID device of FIG. 1.

It will be appreciated that a wide variety of symbols may be displayed as a visual indicator, in order to indicate a wide variety of different information. FIG. 10 shows an example of an indicator 318 (a letter "X"), which may be displayed to indicate inoperability of an RFID device.

Figure 11:
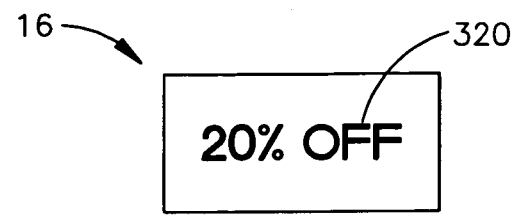

FIG. 11 illustrates another example, in which a discount or sale price 320 is displayed as a visual indicator when a suitable instruction is sent to the RFID device 10. It will be appreciated that displaying indicia indicating a discount may be used as part of a promotional theme, for instance, in order to encourage customer involvement. Another possibility is that a bar code could be changed to represent a modified identity for a product, so that a new price is associated with the product during a checkout process.

Use of visual indicators may also be useful in theft-prevention, and in merchandise authentication. The function within the RFID device 10 may be instituted when an object coupled to the device is sold, such that either a permanent visual indicator is displayed, or a refreshable visual indicator is displayed. Return for refund of improperly acquired merchandise may thus be prevented, as the merchandise may lack the permanent or transient (refreshable) visual indicator indicating that a proper sale has been made. Additionally, a display may be configured to provide a visual indicator indicating an intended source for a product. Such a visual indicator may aid in preventing sale of gray market goods.

Figure 12:
FIGS. 12 and 13 respectively illustrate obscured and revealed information that is part of a display that is usable with the RFID device of FIG. 1.
Figure 13:
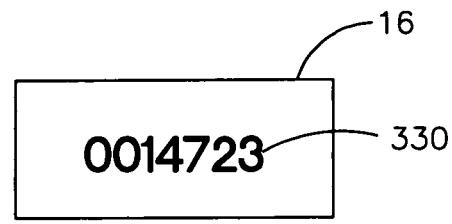

As illustrated in FIGS. 12 and 13, the visual indicator may be used to make information available only upon actuation of the display 16. As indicated in FIG. 12, the display 16 may obscure certain underlying information, such as underlying printed information. Once the display 16 has been activated, for instance by de-activating functionality of the chip 12 of the RFID device 10 (FIG. 1), the display 16 may display underlying informational material, such as a product serial number 330.

Figure 14:
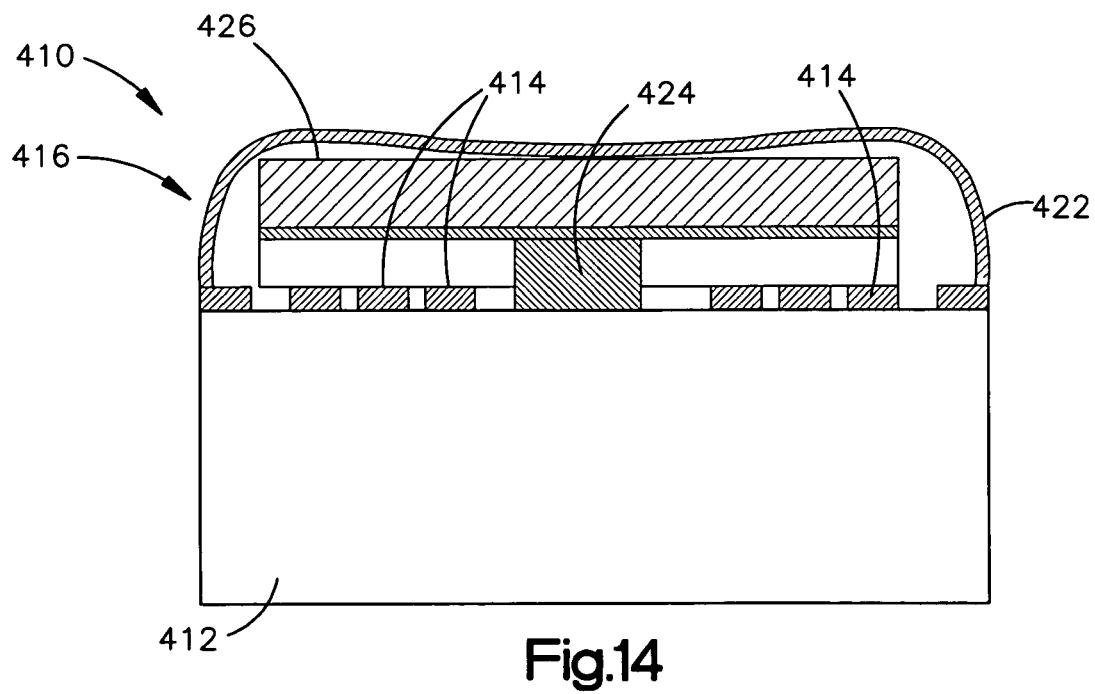
FIG. 14 schematically illustrates another type of RFID device, with a display that integrated with an antenna and a chip, in accordance with the present invention.

FIG. 14 shows another embodiment, wherein an RFID device 410 has a chip 412 that has an antenna 414 and a display built on the chip 412. On an upper surface 420 of the chip 412 is the antenna 414, which may be a coil antenna, a low frequency antenna, or a high frequency antenna. The antenna 414 is operatively coupled to the chip 412. A ground electrode 422 and an input/output electrode 424 of the display 416 are also coupled to corresponding ports of the chip 412. The ground electrode 422 may be a transparent electrode, made of a suitable material such as indium tin oxide. A display material 426 is between the electrodes 422 and 424, such that when a voltage difference is applied across the electrodes 422 and 424, a visual indicator is displayed in the display 416.

The RFID device 410 provides a compact and unobtrusive way of indicating a change of state of the device 410. The display material 426 may be a suitable UV responsive material. The device 410 may be configured such that the material 426 is visible against an object, such as a salable product, only under certain conditions, such as when the object has not been properly sold, registered, or cleared, for example.

Another potential application for the RFID device 10 with the visual display 16 is in the area of RFID devices in labels attached to air cargo containers. It is often required that the operability of such devices be disabled during aircraft flight, because of concerns that operable RFID devices may interfere with aircraft operations, such as interfering with operation of aircraft control systems or aircraft communications systems. Having a visual indication of the state of operability of the RFID devices may facilitate confirming that the devices are disabled prior to aircraft flight, such as by sending signals to the devices causing the devices to temporarily suspend normal operations, for example by entering a "sleep" mode. The visual indicator may also facilitate confirmation of resumption of normal device operating state. Resumption of the normal device operating state may be accomplished, for example, by the sending to the device of a special "wake up" signal.

A further possible application for the RFID device 10 is in making numbers or symbols on a lottery ticket or other form of gambling media, visible on command. The command to change state may be such that it is only issued when payment has been authorized (such as at an electronic point of sale terminal), when money has been transferred to the lottery operator, and when a predetermined change display code, particular to that ticket or other form, is received back from a lottery or authenticating company.

Another possible application is in a re-usable transportation ticket, such as a bus or train ticket or fare card. The display 16 of a device 10 incorporated into such a ticket or fare card may display an indication of the number of rides remaining or amount of fares still chargeable on the ticket or card. Such a display may be a simple color change device that (for example) switches from green to yellow to red as the available fare amount of the ticket or card is used up. Of course, more precise information may be displayable by more complicated displays. Such a display may be reversible as the fare amount of the ticket or card is replenished.

Software or other products may be shipped including an RFID device 10 that obscures a code necessary for use of the object. The device 10 may be configured to have its state changed at a point of sale, so as to make the code visible, thus making the product usable. Theft or other diversion of such products may thus be prevented, as the products are practically useless without the code. As a further precaution, the device 10 may be configured so that any attempt to remove the obscuring layer damages the underlying code, such as an underlying printed code.

It will be appreciated from the foregoing that the visual indicator 18 of the display 16 may be used in a wide variety of applications, to communicate information as triggered by some state of operation of the RFID device 10. The information may involve the operability of the chip 12 or of the device 10 as a whole, or alternatively may simply indicate the state of an internal memory location or logic block of the chip 12. The visual indicator 18 may be used to directly communicate information regarding the operative state of the RFID device 10. Alternatively, or in addition, the visual indicator 18 may be used to communicate a wide variety of additional information, such as information that is for some reason not to be initially known by a viewer of the RFID device 10.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An RFID device comprising:
 a chip;
 an antenna operatively coupled to the chip; and
 a display operatively coupled to the chip;
 wherein the antenna is configured for receiving energy to power the chip;
 wherein the antenna is configured to receive information signals to be passed on to the chip;
 wherein the display includes a visual indicator that provides a visual indication of an operative state of the device; and
 wherein the visual indicator selectively displays or obscures underlying printed material.

2. The device of claim 1, wherein the display includes an electrochromic display.

3. The device of claim 1, wherein the display includes a thermochromic display.

4. The device of claim 1, wherein the display includes a liquid crystal display.

5. The device of claim 1, wherein the display is operatively coupled to an energy storage device that provides power for actuating the display.

6. The device of claim 5, wherein the energy storage device is operatively coupled to the antenna such that part of the energy received by the antenna may be stored in the energy storage device.

7. The device of claim 1, wherein the chip is configured to actuate the display when operation of the chip is disabled.

8. The device of claim 1, wherein the display permanently displays the visual indicator when power is supplied to the display.

9. The device of claim 1, wherein the display transiently displays the visual indicator when power is supplied to the display.

10. The device of claim 1, wherein the visual indicator includes multiple, separately-actuatable visual elements.

11. The device of claim 1,
 wherein the chip includes a memory location and a switch;
 wherein the switch is selectively closed when a predetermined value is written to the memory location; and
 wherein the switch is operatively coupled to the display such that power is provided to the display when the switch is closed.

12. The device of claim 1, wherein the operative state of the device is an internal operative state of the device regarding whether the chip responds to, or otherwise interacts with, ordinary incoming RF signals.

13. The device of claim 1,
 wherein the printed matter includes at least one of text or one or more machine readable symbols; and
 wherein the at least one of the text or the one or more machine readable symbols are unreadable when obscured by the display.

14. An RFID device comprising:
 a chip;
 an antenna operatively coupled to the chip; and
 a display operatively coupled to the chip;
 wherein the antenna is configured for receiving energy to power the chip;
 wherein the antenna is configured to receive information signals to be passed on to the chip;
 wherein the display includes a visual indicator that provides a visual indication of an operative state of the device; and
 wherein the display involves mixing of chemically-reactive materials, such that the display is actuated by mixing the chemically-reactive materials to change color of at least part of the display.

15. The device of claim 14, wherein the display includes multiple display segments.

16. The device of claim 15, wherein one or more of the display segments include a chemical inhibitor that prevents color change when the materials are mixed in the one or more display segments.

17. The device of claim 14, wherein the operative state of the device is an internal operative state of the device regarding whether the chip responds to, or otherwise interacts with, ordinary incoming RF signals.

* * * * *